United States Patent Office 2,744,932
Patented May 8, 1956

2,744,932

ANHYDROTETRACYCLINE

Coy W. Waller, Nanuet, N. Y., and Angela A. Goldman, River Edge, N. J., assignors to American Cyanamid Company, New York, N. Y., a corporation of Maine No Drawing. Application October 11, 1952,
Serial No. 314,405

3 Claims. (Cl. 260—559)

This invention relates to anhydrotetracycline, acid addition salts thereof and methods of preparing the same.

The new compound anhydrotetracycline is believed to be best represented by the following structural formula:

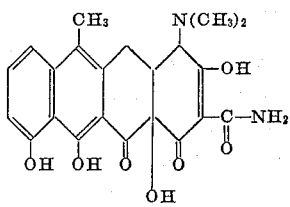

As will be seen from the above formula, anhydrotetracycline is an amine base and, therefore, forms addition salts with acids in a manner typical of all amine bases. For instance, it can be isolated in the form of its addition salt with hydriodic acid.

Anhydrotetracycline and its acid addition salts are of interest in many fields of chemistry. They are, for instance, of value as germicides, it having been found that these compounds show germicidal activity against a large number of Gram-positive and Gram-negative bacteria.

While it is not intended that this invention be limited to anhydrotetracycline and its acid addition salts when prepared by any one particular procedure, a new method of preparing these new compounds has been discovered and it is intended that this new method also constitute a part of the present invention. The new method of this invention comprises treating with hydriodic acid a compound selected from the group consisting of chlortetracycline, anhydrochlortetracycline and salts of aureomycin and anhydrochlortetracycline. The reaction with anhydrochlortetracycline can best be illustrated by the following equation:

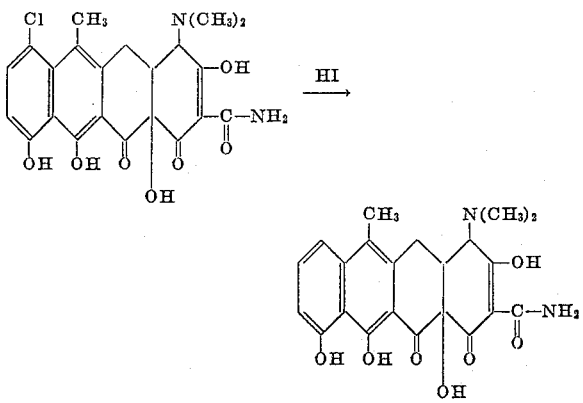

And with chlortetracycline, the reaction can be illustrated by the following equation:

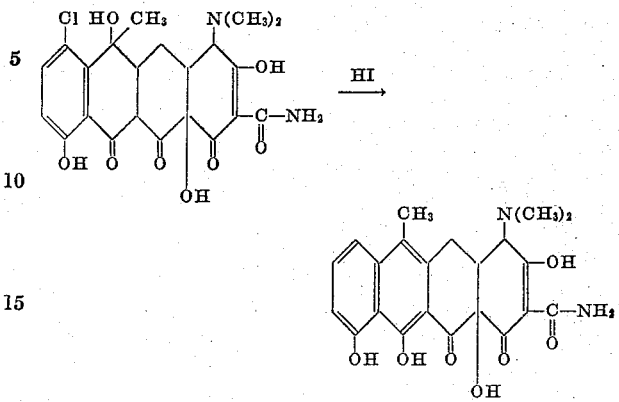

As can be seen from the above, with anhydrochlortetracycline the hydriodic acid acts as a dechlorinating agent and with chlortetracycline it acts as both a dechlorinating agent and dehydrating agent.

Chlortetracycline and its acid salts are well-known compounds and can be prepared by methods well-known to those skilled in the art. Anhydrochlortetracycline is a new compound, constituting a part of the subject matter of copending U. S. application S. N. 314,408 filed concurrently herewith, and can be prepared by methods disclosed therein.

With either chlortetracycline or anhydrochlortetracycline, suitable reaction conditions for the new process of this invention are essentially the same. The hydriodic acid can be employed in a solution of any concentration up to about 57% HI although 48% hydriodic acid is usually employed for reasons of convenience. The reaction can be conducted at almost any convenient temperature, for instance at room temperature; although, higher temperatures, for instance 60° C.–80° C. or even 100° C., are usually employed since the reaction is more rapid at such temperatures. At room temperature the reaction is reasonably complete in about forty-eight hours and at about 80° C. the reaction is reasonably complete in from one-half to one hour. If the reaction is to be conducted at a relatively high temperature or for a prolonged period, it is sometimes advantageous to add a small quantity of red phosphorus to remove the free iodine liberated by the reaction.

The invention will be more particularly illustrated by means of the following specific examples:

Example I

Twenty grams of chlortetracycline hydrochloride were heated at 75° C.–80° C. with 300 ml. of 48% HI for one-half hour at the end of which time, an equal volume of water was added and the solution cooled in an ice-bath for two hours. The precipitate of crude anhydrotetracycline hydriodide which formed was collected, washed with a small quantity of water and then suspended in 500 ml. of water. There was then added, with stirring, one liter of ethyl acetate over a period of ten minutes during which time sufficient NaOH was added to maintain the pH of the water phase at 4.5. The ethyl acetate phase was then separated and the remaining aqueous phase extracted, while maintaining the pH at 4.5, with an additional liter of ethyl acetate. The ethyl acetate extracts were combined, concentrated to dryness and the resulting residue dissolved in a minimum amount of boiling alcohol (approx. 2 l.). Upon cooling, 12.5 gms. of anhydrotetracycline were obtained as a crystalline precipitate. This material had a melting point of about 224° C.–226° C. with evolution of gas, $[\alpha]_D^{25°} + 24°$ (in cellosolve).

Example II

Chlortetracycline hydrochloride, 15 g., was dissolved in 50 ml. of concentrated HCl and heated on a steam-bath for ten minutes. Then 150 ml. of water were added and a heavy precipitate separated. This material was centrifuged from the solution and dissolved in 1.5 liters of water. The pH of this aqueous solution was adjusted to about 5 with 6 N NaOH, and the solution was extracted six times with equal volumes of ethyl ether. The combined ether extracts were dried by freezing out the water, and the dry ether solution was then concentrated to a small volume. Long orange needles formed and were collected by filtration yielding 10.5 g. of anhydrochlortetracycline having a melting point of about 205° C.–210° C. with decomposition.

The procedure of Example I was repeated except that an equal molar quantity of anhydrochlortetracycline was substituted for the chlortetracycline of Example I. Anhydrotetracycline was obtained in substantially equal yield.

We claim:

1. Compounds selected from the group consisting of anhydrotetracycline of the formula:

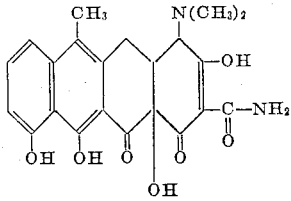

and the hydriodic acid addition salt thereof.

2. The new compound anhydrotetracycline of the formula:

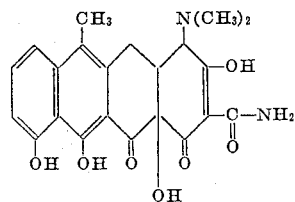

3. The new compound anhydrotetracycline hydroiodide of the formula:

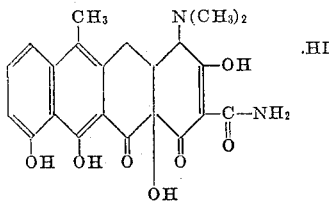

References Cited in the file of this patent

UNITED STATES PATENTS

| | | |
|---|---|---|
| 2,482,055 | Duggar | Sept. 13, 1949 |
| 2,516,080 | Sobin et al. | July 18, 1950 |
| 2,699,054 | Conover | Jan. 11, 1955 |

OTHER REFERENCES

Waller et al.: JACS, vol. 74 (1952), pp. 4981–2.
Dunitz: JACS, vol. 74, Feb. 20, 1952, p. 1108.
Dunitz: JACS, vol. 72 (1950), pp. 4276–7.